(12) United States Patent
Hasegawa

(10) Patent No.: US 10,939,253 B2
(45) Date of Patent: Mar. 2, 2021

(54) RADIO COMMUNICATION SYTEM AND ACCESS CONTROL METHOD

(71) Applicant: HITACHI KOKUSAI ELECTRIC INC., Tokyo (JP)

(72) Inventor: Keigo Hasegawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/761,657

(22) PCT Filed: Nov. 15, 2017

(86) PCT No.: PCT/JP2017/041055
§ 371 (c)(1),
(2) Date: May 5, 2020

(87) PCT Pub. No.: WO2019/097599
PCT Pub. Date: May 23, 2019

(65) Prior Publication Data
US 2020/0382913 A1 Dec. 3, 2020

(51) Int. Cl.
*H04W 4/08* (2009.01)
*H04W 48/08* (2009.01)
(Continued)

(52) U.S. Cl.
CPC .............. *H04W 4/08* (2013.01); *H04W 48/06* (2013.01); *H04W 48/08* (2013.01); *H04W 88/08* (2013.01); *H04W 88/12* (2013.01)

(58) Field of Classification Search
None
See application file for complete search history.

(56) References Cited

U.S. PATENT DOCUMENTS

2013/0195081 A1   8/2013   Merlin et al.
2014/0113642 A1   4/2014   Yamana et al.
(Continued)

FOREIGN PATENT DOCUMENTS

JP     2014-86918 A     5/2014
JP     2014-528665 A    10/2014

OTHER PUBLICATIONS

International Search Report dated Jan. 30, 2018.
(Continued)

*Primary Examiner* — Hong S Cho
(74) *Attorney, Agent, or Firm* — Bacon & Thomas, PLLC

(57) ABSTRACT

A plurality of terminal stations that share the same access point are controlled to have communication opportunities on the basis of terminal station groups (e.g., operators). A radio communication system, in which the plurality of terminal stations 102 to 106 is connected to a network via an access point 101, includes an access manager 107 connected to the access point. The access manager includes a user/group manager that manages the plurality of terminal stations in groups, and a radio resource manager that determines the necessity of bandwidth limit on the basis of the communication status of each of the groups and transmit from the access point a control message that allows communication of a particular group among the groups and stops communication of other groups when it is determined that the bandwidth limit is necessary.

4 Claims, 4 Drawing Sheets

(51) Int. Cl.
*H04W 88/08* (2009.01)
*H04W 88/12* (2009.01)
*H04W 48/06* (2009.01)

(56) References Cited

U.S. PATENT DOCUMENTS

2016/0113041 A1* 4/2016 Smith ............... H04W 72/0493
  455/404.1
2017/0346775 A1* 11/2017 Liu ..................... H04L 29/08

OTHER PUBLICATIONS

Wan Hafiza, Wan Hassan, Horace King, Shabbir Ahmed and Mike Faulkner, "Transmission priority scheme with adaptive backoff technique in fiber-wireless networks", EURASIP Journal on Wireless Communications and Networking, (2015), 2015:99 DOI 10.1186/s13638-015-0323-4.

* cited by examiner

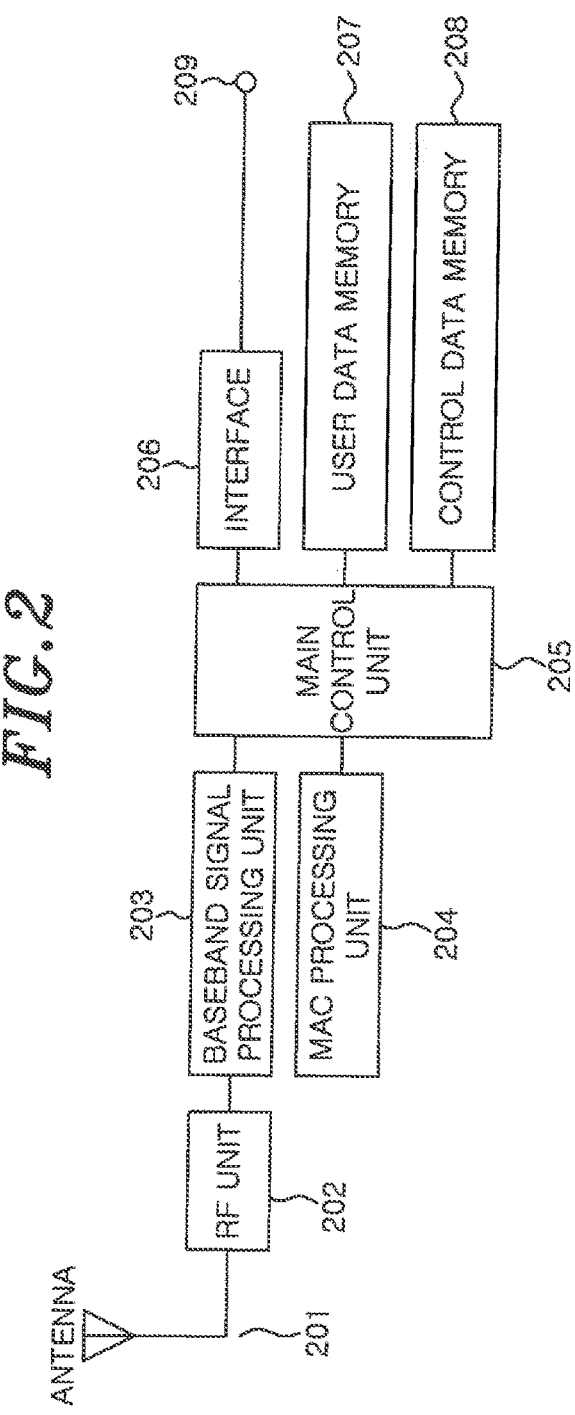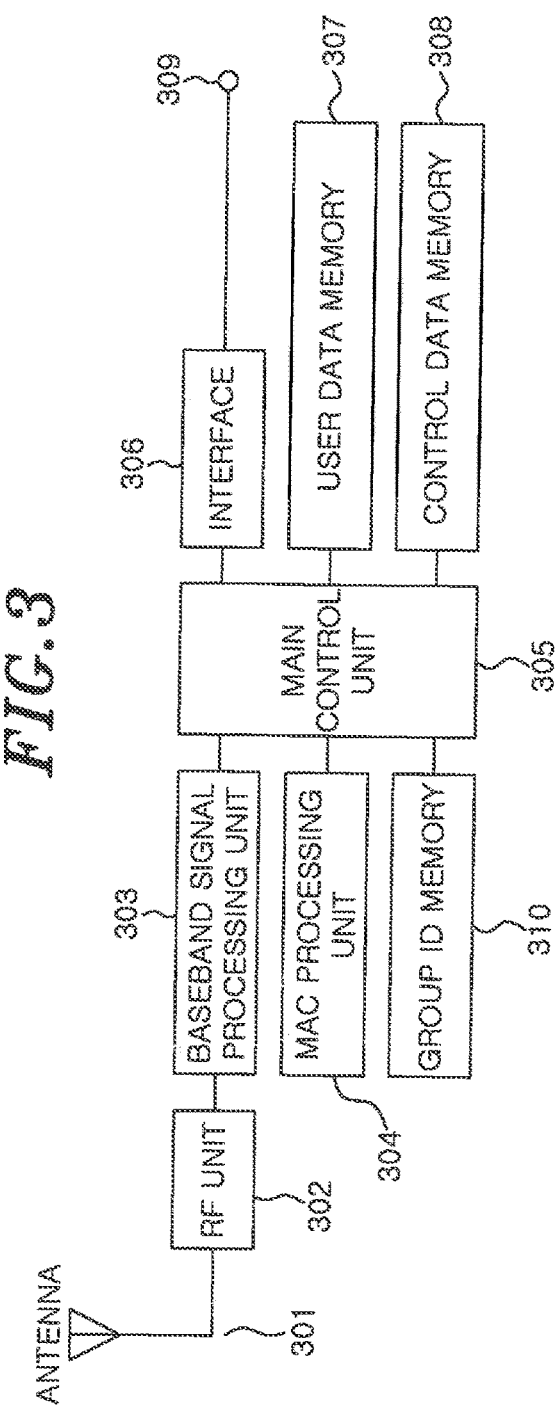

RADIO COMMUNICATION SYTEM AND ACCESS CONTROL METHOD

TECHNICAL FIELD

The present invention relates to a radio resource control technique using an access point of a wireless system using a contention-based media access control (MAC) protocol such as a wireless local area network (LAN) or the like.

BACKGROUND

Currently, a wireless LAN is widely used as a communication system. Wireless LAN uses the IEEE 802.11 standard. An industry standard is defined by, e.g., Wi-Fi Alliance and a product is certified to be in compliance with the standard. Accordingly, wireless LAN devices (access points and terminal stations) of different manufacturers can communicate with each other, contributing to user convenience.

Generally, Wi-Fi performs communication using the 2.4 GHz or 5 GHz industry science medical (ISM) band. Since the ISM band is an unlicensed band, interference between wireless stations (access points and terminal stations) cannot be avoided. Therefore, Wi-Fi defines a MAC protocol referred to as "Carrier Sense Multiple Access with Collision Avoidance (CSMA/CA)." In CSMA/CA, a random carrier sense period (backoff time) is set before transmission starts in order to monitor a wireless signal. If the wireless signal is not received within the carrier sense period, it is determined that a wireless channel is not used, and then the transmission is started. This makes it possible to avoid interference. However, wireless signal detection may fail due to shadowing, multipath fading, or the like, and the backoff time may be the same among a plurality of transmission terminals. In that case, the transmission occurs simultaneously and the communication fails.

Therefore, there is defined a method referred to as "Request-To-Send/Clear-To-Send (RTS/CTS)" for reserving, before transmission of data, a transmission time period between transmission and reception. In RTS/CTS, a transmission station transmits RTS to notify its neighboring stations of a scheduled transmission time and a communication partner, and a reception station of a receiver that has received the RTS transmits CTS to notify a scheduled communication time. Accordingly, it is possible to stop the transmission of neighboring wireless devices during communication.

However, the application range of wireless LAN has expanded and the number of wireless stations has increased. Therefore, even if the above-described methods are used, it is not easy to avoid interference between the wireless stations. In order to avoid interference, sharing an access point between different operators (operation subjects) is considered. By sharing the access point, it is possible to avoid collisions of transmissions (downlink) from the access point to the terminal stations. Such an effect is significant because many wireless LANs mainly perform downlink communication such as accessing the Internet or the like. On the other hand, in the case of uplink, communication collision still occurs because the terminal stations are contention-based MAC protocols. Further, the terminal stations obtain communication opportunities fairly, so it is not possible to control the amount of resources that can be used in the communication between the operators. Accordingly, when there is a difference in traffic between the operators, an operator with more traffic uses more radio resources and the communication opportunity of an operator with less traffic is reduced, which leads to unfairness between the operators.

As an example of a method for providing a priority of transmission opportunities, a MAC protocol defined by IEEE 802.11e is considered. Since, however, this protocol is based on polling, complicated scheduling such as the order of polling or the like is required.

Non-Patent Document 1 discloses a method of optimizing a range of a backoff time of each of an access point and a terminal station to prevent the access point connected to a backhaul line from becoming a bottleneck. However, Non-Patent Document 1 does not disclose the priority settings between terminals.

By applying IEEE 802.11e together with the method of Non-Patent Document 1, it is possible to control fairness between the operators. However, many wireless LAN terminals comply with IEEE 802.11a/b/g/n/ac that employs a contention-based MAC protocol. In applying these methods, such terminal stations need to be changed and cases of different operators sharing an access point are inadequate.

PRIOR ARTS

Non-Patent Document

Non-Patent Document 1: Wan Hafiza, Wan Hassan, Horace king, Shabbir Ahmed and Mike Faulkner, "Transmission priority scheme with adaptive backoff technique in fiber-wireless networks," EURASIP Journal on Wireless Communications and Networking (2015), 2015:99 DOI 10.1186/s13638-015-0323-4.

SUMMARY

In view of the above, the present invention is provided to control a communication opportunity on a basis of a terminal station group (e.g., operator) in a case where a plurality of terminal stations share the same access point.

In accordance with an aspect of the present invention, there is provided a radio communication system in which a plurality of terminal stations perform communications via an access point, the radio communication system including: an access manager connected to the access point. Further, the access manager includes a group manager configured to manage the terminal stations in groups; and a radio resource manager configured to determine if bandwidth limit is necessary based on communication status of each of the groups and transmit from the access point a control message that allows communication of a particular group among the groups and stops communication of other groups when it is determined that the bandwidth limit is necessary.

With such configuration, the access manager connected to the access point monitors the communication status of the terminal stations that are under the control of the access point on a group basis and controls, when the bandwidth limit is necessary, a terminal station of a particular group to have a priority to perform communication.

Further, in one embodiment, the group manager may notify the terminal stations that are under the control of the access point of the identification information of the groups to which the respective terminal stations belong. The radio resource manager may transmit the control message storing identification information of the particular group whose communication is allowed from the access point. Each of the terminal stations may compare the identification information of the particular group stored in the control message with the identification information of the group to which the corresponding terminal station belongs and stop communication when the identification information of the particular group stored in the control message is not matched with the identification information of the group to which the corresponding terminal station belongs.

With such configuration, it is possible to restrict the communication of the terminal stations belonging to other groups simply by transmitting the control message storing the ID of the group whose communication is allowed.

More specifically, the identification information of the groups may be values that are not overlapped with MAC addresses of the respective terminal stations. The control message may be an RTS message or a CTS message in which the identification information of the particular group is stored in a receiver address field. Each of the terminal stations may refer to the receiver address field of the RTS message or the CTS message, determine whether or not the received message is addressed to the corresponding terminal station, and also compare the receiver address field with the identification information of the group to which the corresponding terminal station belongs.

With such configuration, it is possible to control the terminal station of the particular group to have priority to perform communication while coexisting with conventional wireless LAN (Wi-Fi) terminal stations.

Effect

In accordance with the present invention, when the same access point is shared by a plurality of terminal stations, it is possible to control a communication opportunity on the basis of a terminal station group (e.g., operator).

BRIEF DESCRIPTION OF THE DRAWINGS

FIG. 2 shows a configuration example of an access point in the radio communication system shown in FIG. 1.

FIG. 3 shows a configuration example of a terminal station in the radio communication system shown in FIG. 1.

DETAILED DESCRIPTION

Figure 1:
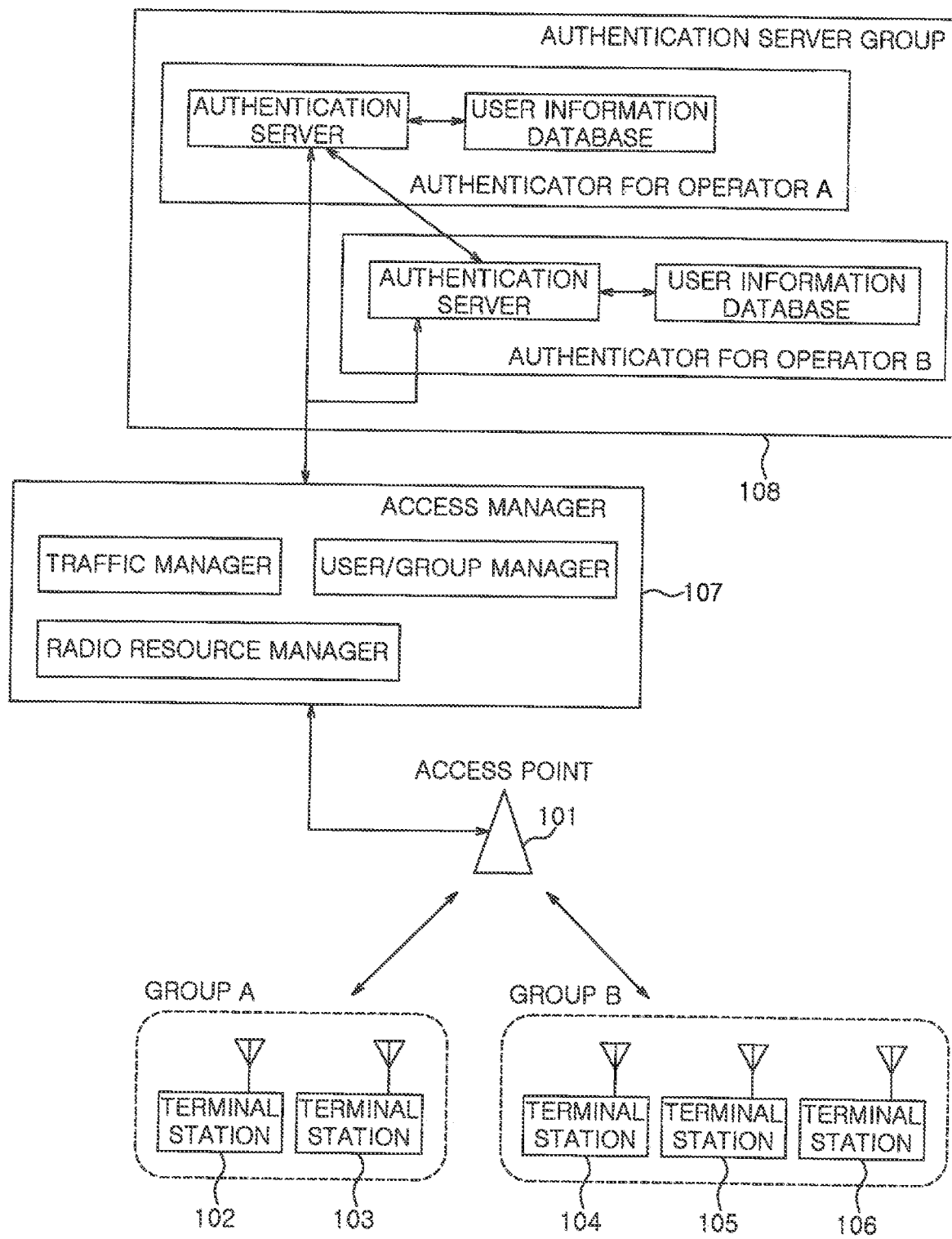
FIG. 1 shows an example of an overall configuration of a radio communication system according to an embodiment of the present invention.

Hereinafter, examples of embodiments of the present invention will be described with reference to the drawings. Throughout the drawings and the following description, like reference numerals will be given to like parts.

FIG. 1 shows an example of an overall configuration of a radio communication system according to an embodiment of the present invention. The radio communication system of the present embodiment includes an access point 101, a plurality of terminal stations (STAs) 102, 103, 104, 105, and 106 connected to a network via the access point 101, an access manager 107 connected to the access point 101, and an authentication server group 108 for authenticating the terminal stations 102 to 106.

The radio communication system of the present embodiment adopts Wi-Fi protocols such as IEEE 802.11a, 802.11b, 802.11g, 802.11n, 802.11ac, or the like as a basis.

The authentication server group 108 has basically the same configuration as that of a conventional authentication server group.

The access point 101 has basically the same configuration as that of a conventional access point. However, the access point 101 is different from the conventional access point in that the access point 101 is configured to have other functions such as transmission of a group ID allocation message for notifying a group ID allocated to a terminal station, transmission of a control message (MAC frame) for controlling a transmission authority of a terminal station, and the like. The group ID is identification information for identifying each group.

Each of the terminal stations 102 to 106 has basically the same configurations as that of a conventional terminal station. However, the terminal stations 102 to 106 are different from the conventional terminal station in that each of the terminal stations 102 to 106 is configured to have other functions such as a function of determining whether or not a received message is addressed to the group to which the corresponding terminal station belongs, and the like.

The access point 101 and the terminal stations 102 to 106 shown in FIG. 1 are merely examples, and the number of access points and the number of terminal stations may vary.

In this example, the access point 101 is managed by an operator (provider) A, and the operator A provides a connection service via the access point 101 to users (terminal stations 102 and 103) subscribed to the operator A. Further, the operator A allows users (terminal stations 104, 105, and 106) subscribed to an operator (provider) B to access the access point 101. Here, a group of users (terminal stations 102 and 103) subscribed to the operator A is referred to as "group A" and a group of users (terminal stations 104, 105 and 106) subscribed to the operator B is referred to as "group B." In other words, in this example, the terminal stations classified on the basis of operators are matched with the terminal stations of the groups. Generally, the operator A receives a service charge such as a usage fee (connection fee) in exchange for providing the operator B with the authority of using the access point. Here, an example in which two operators (groups) share the access point has been described. However, three or more operators (groups) may share the same access point.

The access manager 107, which is one of the technical features of the present invention, is configured to have a function of managing multiple terminal stations in groups and controlling communication opportunities of the terminal stations on the basis of groups. Specifically, the access manager 107 has a function of relaying (proxying) a message transmitted and received between the users (the terminal stations 102 to 106) and the authentication server group 108 during an authentication process, a function of a user/group manager for managing the users and the groups of the users, a function of a traffic manager for monitoring a communication status such as a communication traffic of each user or a period of time in which radio resources are used, and a function of a radio resource manager for managing allocation of the radio resources to the groups.

The user/group manager is configured to allocate a group ID to a terminal station that has been successfully authenticated and notifies the terminal station of the group ID. Further, the user/group manager stores an ID (e.g., MAC address) of the terminal station in association with the group ID allocated to the corresponding terminal station.

The traffic manager is configured to monitor communication status (states) of the respective terminal stations via the access point. Further, the traffic manager analyzes the communication status of the groups based on the communication status of the respective terminal stations.

The radio resource manager is configured to determine whether or not bandwidth limit is necessary based on the communication status of each of the groups. When it is determined that the bandwidth limit is necessary, the radio resource manager transmits a control signal from the access point for allowing the communication of a particular group and stopping the communication of other groups.

The authentication server group 108 includes a plurality of authentication servers for performing an authentication process in response to an authentication request from the terminal station. The authentication server group 108 of this example includes an authenticator for operator A having an authentication server for authenticating users (terminal stations 102 and 103) subscribed to the operator A and a user information database used during the authentication process; and an authenticator for operator B having an authentication server for authenticating users (terminal stations 104, 105, and 106) subscribed to the operator B and a user information database used during the authentication process.

The access manager 107 and the authentication server group 108 represent a set (entity) of functions and do not represent a physical object. Therefore, the access manager 107 and the authentication server group 108 may be implemented by one server or may be implemented by a plurality of servers. In this example, the terminal stations are grouped on the basis of operators. However, the terminal stations may be grouped in a different manner to control the priority and the fairness of the terminal stations.

For example, in the case of employing the present embodiment to machine-to-machine (M2M) communication or the like, the terminal stations may be divided into a group of terminal stations that perform communication requiring reliable transmission and low delay and a group of the other remaining terminal stations.

<Specific Configuration Example of Access Point>

FIG. 2 shows a configuration example of the access point 101. The access point 101 includes an antenna 201, an RF unit 202, a baseband (BB) signal processing unit 203, a MAC processing unit 204, a main control unit 205, an interface 206, a user data memory 207, a control data memory 208, and an external network connection terminal 209.

The antenna 201 is configured to transmit and receive radio waves.

The RF unit 202 is configured to perform frequency conversion from a baseband to a radio frequency band, frequency conversion from a radio frequency band to a baseband, signal amplification, and the like.

The BB signal processing unit 203 is configured to perform error correction coding, decoding, modulation/demodulation, and the like.

The MAC processing unit 204 is configured to perform the control of data transmission/reception timing, the addition of a MAC address of a sender (transmitter) and a MAC address of a receiver to a packet at the time of data transmission, and the recognition of a MAC address of the data transmission source and a MAC address of a receiver at the time of data reception, and the like.

The main control unit 205 is configured to centrally control the respective components and serves as an interface between the components.

The interface 206 serves as an interface with an external network and is configured to have a function of an upper layer such as TCP/IP, a function of converting protocols with the external network, or the like.

The user data memory 207 is configured to have a function of storing data plan communication data.

The control data memory 208 is configured to have a function of storing a control message.

The external network connection terminal 209 is used to connect to the external network.

<Specific Configuration Example of Terminal Station>

FIG. 3 shows a configuration example of each of the terminal stations 102 to 106. Each of the terminal stations 102 to 106 includes an antenna 301, an RF unit 302, a baseband (BB) signal processing unit 303, a MAC processing unit 304, a main control unit 305, an interface 306, a user data memory 307, a control data memory 308, an external network connection terminal 309, and a group ID memory 310.

The respective components 301 to 309 in each of the terminal stations 102 to 106 have the same functions as those of the respective components 201 to 209 in the access point 101.

However, the MAC processing unit 304 is different from the MAC processing unit 204 in the access point 101 in that the MAC processing unit 304 is configured to have a function of determining, when a received message is not addressed to the terminal station, whether or not the received message is addressed to a group to which the terminal station belongs.

The group ID memory 310 is configured to have a function of storing a group ID allocated to the terminal station by the access manager 107. When a message from the access point 101 is received, the group ID memory 310 is referenced to determine whether or not the received message is addressed to the group to which terminal station belongs.

<Sequence of Resource Control>

Figure 4:
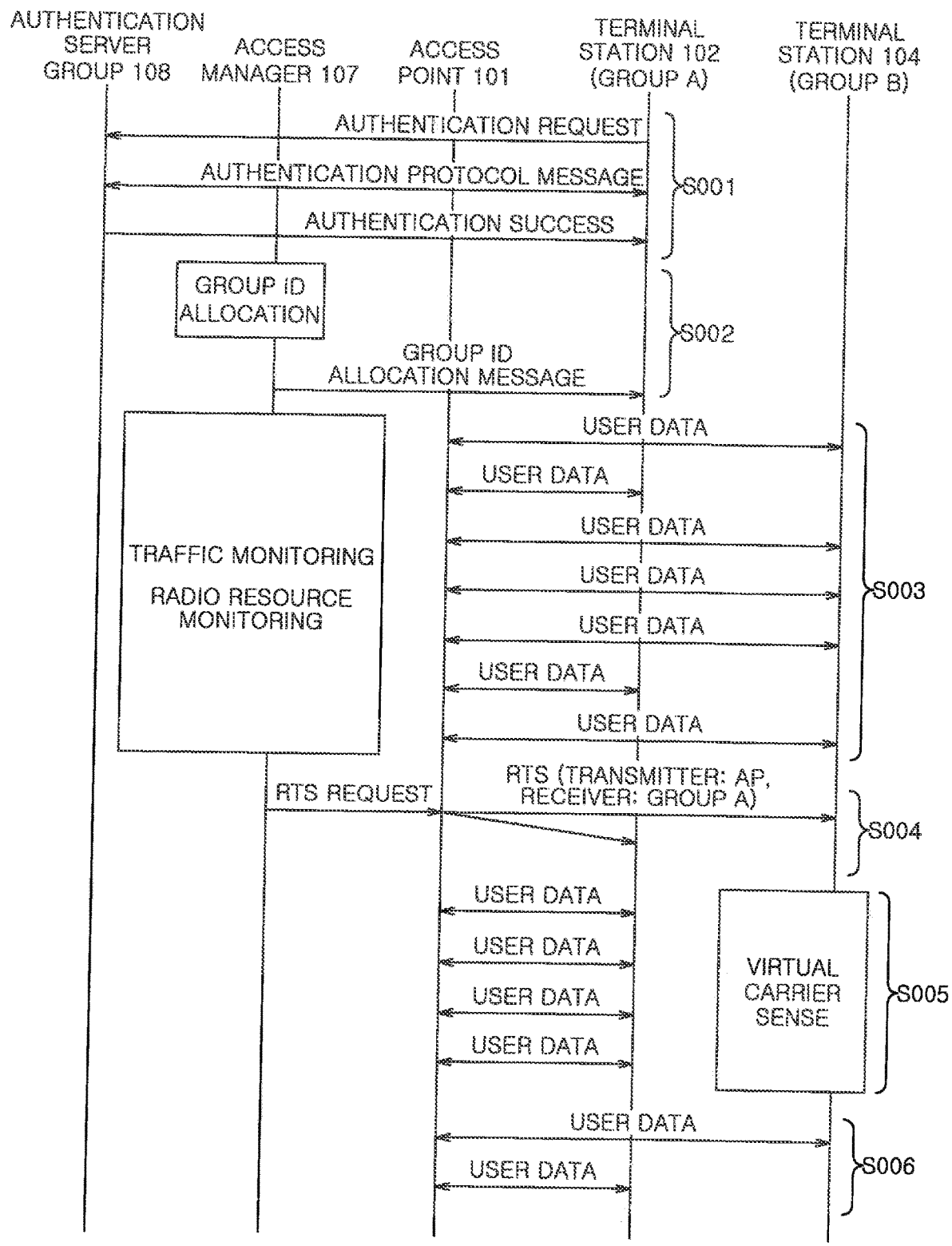
FIG. 4 shows an example of a sequence of resource control in the radio communication system shown in FIG. 1.

Hereinafter, the resource control of the radio communication system in this example will be described with reference to FIG. 4, showing an example of a sequence of the resource control.

(Step S001) The terminal station 102 transmits an authentication request message to the access point 101 to access the network via the access point 101. The terminal station 102 requests authentication based on information on the access point 101 such as a MAC address that is periodically transmitted by the access point 101 or information notified in advance by a network administrator.

The access point 101 transmits the authentication request message to the access manager 107 to execute the authentication process for the terminal station 102. The access manager 107 transmits the authentication request message to an appropriate authentication server in the authentication server group 108 based on the information of the terminal station (or the subscriber) included in the authentication request message. The information of the terminal station (or the subscriber) includes a MAC address, a mail address, a user account (ID), information on a SIM card (e.g., a telephone number), and the like. In this example, since the terminal station 102 is subscribed to the operator A, the access manager 107 transmits the authentication request message from the terminal station 102 to the authentication server of the authenticator for operator A.

When the authentication request message is received, the authentication server of the authenticator for operator A transmits and receives an authentication protocol message to and from the terminal station 102 to execute the authentication process. Then, when the authentication process succeeds, the authentication server of the authenticator for operator A transmits an authentication success message to the terminal station 102 via the access manager 107 and the access point 101. The processes from the authentication request to the authentication success can be realized by the conventional technique.

(Step S002) Since the access manager 107 has the function of relaying a message between the terminal station 102 and the authentication server group 108 during the authentication process for the terminal station 102, the access manager 107 can recognize the determination of whether or not the terminal station 102 has been authenticated by analyzing the message. When the terminal station 102 has been successfully authenticated, the access manager 107 allocates a group ID to the terminal station 102. The access manager 107 utilizes the access point 101 to transmit a group ID allocation message for notifying the terminal station 102 of the group ID. For example, the group ID allocation message may be transmitted as an IP packet from the access manager 107 through the access point 101 or the access point 101 may be instructed to transmit the group ID allocation message.

In this example, the terminal stations are grouped on the basis of operators, so that the ID of the group A is allocated to the terminal station 102 subscribed to the operator A. The group ID may be allocated in a different manner. For example, the terminal stations may be grouped based on the type of terminal station (sensor, smartphone, camera, and the like) and a group ID may be allocated based thereon. Alternatively, the terminal stations may be grouped on the basis of which radio resources are preferred to be managed with the same class (priority) and a group ID may be allocated based thereon. Further, a plurality of group IDs may be allocated to one terminal station, so that more flexible resource management can be performed. Although it is not illustrated in FIG. 4, the ID of the group B is allocated to the terminal station 104. The group ID is set to a value that is not overlapped with the MAC address of the access point or the terminal station to be connected to the access point. In this example, the group ID is set to have the same length (48 bits) as that of the MAC address. However, it is not necessary for the group ID to have the same length as that of the MAC address.

In this example, the group ID is allocated during the authentication process for the terminal station. However, the group ID may be allocated in advance. In one example, a group ID to be allocated to the terminal station is determined and stored in the access manager 107 at a predetermined timing before the terminal station is connected to the network, such as at the time of product shipment, the time of sale of the terminal or the like and, then, the group ID may be notified when authentication of the terminal station is succeeded. In another example, the group ID to be allocated to the terminal station is stored in both of the access manager 107 and the group ID memory 310 of the terminal station at a predetermined timing before the terminal station is connected to the network. In that case, step S002 may be omitted. In the case of setting the group ID in advance in the terminal station, a professional may set the group ID in a non-rewritable format at the time of product shipment or the time of sale of the terminal. In still another example, the user of the terminal station may manually set the group ID and notify the access manager 107 of the group ID together with the authentication request at the time of connecting to the network.

(Step S003) The access manager 107 monitors the communication status of each of the terminal stations 102 and 104 connected to the network via the access point 101. Specifically, the access manager 107 monitors the communication traffic, communication speed, transmission time (radio resource usage amount), and the like. When the resource control of the access manager 107 is not performed, all of the terminal stations can fairly obtain communication opportunities as in the case of the conventional Wi-Fi.

(Step S004) The access manager 107 monitors and analyzes the communication status (states) of the respective groups based on the communication status of the respective terminal stations and determines whether or not bandwidth limit is necessary based on the communication status of the respective groups. In this example, the bandwidth limit is determined to be necessary when the communication status of the groups satisfy a predetermined condition. When it is determined that the bandwidth limit is necessary, the access manager 107 performs a resource control to authorize transmission to one group and restrict the communication of other groups.

Various conditions can be used as the predetermined condition. For example, the predetermined condition may include the determination of whether or not the communication traffic or the radio resource usage amount exceeds a preset amount set in advance for each group, or the determination of whether or not the communication traffic between the groups or the ratio of the communication time period between the groups exceeds a threshold.

In this example, the communication time period of the group B is longer than that of the group A and the ratio of the communication time period therebetween exceeds the threshold, so that the group A has transmission authority and the communication of the group B is restricted.

The access manager 107 requests the access point 101 to transmit a request-to-send (RTS) message to give the transmission authority to the group A. The access point 101 stores the group ID of the group A in a receiver address of the RTS message and transmits the RTS message.

Figure 5:
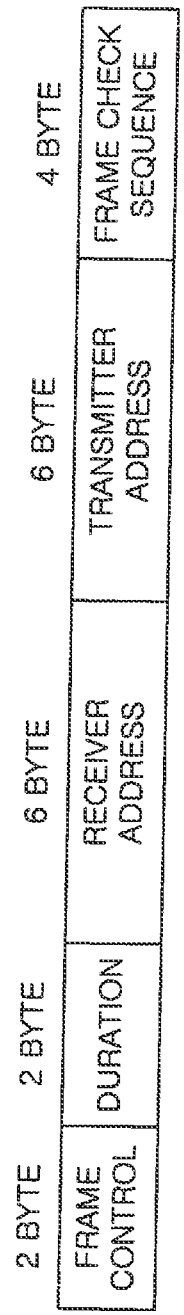
FIG. 5 shows a format of an RTS message in the IEEE 802.11 standard.

FIG. 5 shows a format of the RTS message in the IEEE 802.11 standard. Generally, a MAC address of a receiver that is a communication target is specified in the receiver address field of RTS, and the terminal station other than the receiver performs virtual carrier sense to stop transmission during a period specified in a duration field of RTS. In this example, a group ID of 48 bits (6 bytes) is specified in the receiver address field, so that the transmission authority for each group can be obtained. The value of the duration field indicates a scheduled period (time period required for frame transmission) in which radio waves are used.

Figure 6:
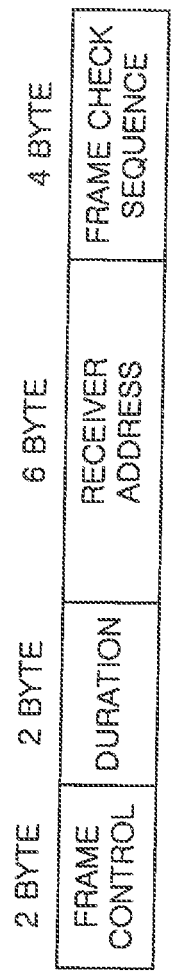
FIG. 6 shows a format of a CTS message in the IEEE 802.11 standard.

Although the above example has described the method using RTS, the method using clear-to-send (CTS) can also be performed. In other words, the same effect can be obtained by specifying the group ID in the receiver address field of the CTS message in the IEEE 802.11 standard shown in FIG. 6.

(Step S005) The terminal stations 102 and 104 that have received the RTS compare the value of the receiver address field of the RTS with their MAC addresses stored in the user data memory 307 to determine whether or not the message is addressed to themselves. When it is determined that the message is not addressed to the terminal stations 102 and 104, the terminal stations 102 and 104 compares the value of the receiver address field of the RTS with their group IDs stored in the group ID memory 310 to determine whether or not the message is addressed to the groups to which they belong.

Since the terminal station 104 has received the RTS that is neither addressed to itself nor addressed to the group to which it belongs, the terminal station 104 performs the virtual carrier sense to stop transmission for a period specified in the duration field of the RTS. On the other hand, since the terminal station 102 has received the RTS that is not addressed to itself but addressed to the group to which it belongs, it is determined that the terminal station 102 has the transmission authority and the terminal station 102 can continue to perform the transmission.

Generally, the MAC address of the terminal station that is a communication target is specified in the receiver address field of the RTS. Therefore, the terminal station of the present example can determine whether to perform transmission by causing the MAC processing unit 304 to determine whether or not the message is addressed to itself and then referring to the group ID stored in the group ID memory 310. The conventional Wi-Fi terminal station stops transmission when it is determined that the message is not addressed to itself.

(Step S006) The terminal station 104 of the group B that has stopped transmission for the period specified in the duration field can perform normal transmission. Therefore, after the period specified in the duration field elapses, the terminal station 102 of the group A and the terminal station 104 of the group B can obtain fair communication opportunities again.

As described above, the radio communication system of the present example has the configuration in which the terminal stations 102 to 106 are connected to the network via the access point 101 and includes the access manager 107 connected to the access point 101. The access manager includes the user/group manager for managing the terminal stations in groups, and the radio resource manager for determining whether or not bandwidth limit is necessary based on the communication status of the respective groups and transmitting from the access point the control message that allows communication of a particular group and causes other groups to stop communication when it is determined that the bandwidth limit is necessary.

With such configuration, the access manager connected to the access point can monitor the communication status of the terminal stations that are under the control of the access point on a group basis and controls, when the bandwidth limit is necessary, a terminal station of a particular group to have priority to perform communication. Therefore, when the same access point is shared by the multiple terminal stations, the communication opportunity can be controlled on the basis of terminal station groups (e.g., operators) and the fairness or the priority of the communication opportunities among the terminal station groups can be controlled.

Further, in the radio communication system of the present example, the user/group manager notifies the terminal stations that are under the control of the access point of the IDs of the groups to which the respective terminal stations belong, and the radio resource manager transmits the control message storing the ID of the group whose communication is allowed from the access point so that the terminal station can stop communication when the group ID stored in the control message is not matched with its group ID.

With such configuration, it is possible to restrict the communication of terminal stations belonging to other groups simply by transmitting the control message storing the ID of the group whose communication is allowed.

Further, in the radio communication system of this example, the group ID is a value that is not overlapped with the MAC address of the terminal station. Further, the control message is the RTS message (or CTS message) in which the ID of the group whose communication is allowed is stored in the receiver address field and the terminal station stops communication when the receiver address field of the message is not matched with both of its MAC address and the ID of the group to which the corresponding terminal station belongs.

With such configuration, it is possible to control the terminal station of the particular group to have the priority to perform communication while coexisting with conventional wireless LAN (Wi-Fi) terminal stations.

Further, in the radio communication system of the present example, the terminal stations 102 to 106 may correspond to the terminal stations of the present invention; the access point 101 may correspond to the access point of the present invention; the access manager 107 may correspond to the access manager of the present invention; the user/group manager may correspond to the group manager in the present invention; and the radio resource manager may correspond to the radio resource manager of the present invention.

The configurations of the system, the device, and the like of the present invention are not limited to those described above, and various configurations may be used.

The present invention can also be provided as a scheme or a method for executing the above-described processes, a program for realizing the scheme or the method, a storage medium for storing the program, or the like.

INDUSTRIAL APPLICABILITY

The present invention can be employed in various types of radio communication systems in which a plurality of terminal stations communicate via an access point.

EXPLANATION OF REFERENCE NUMERALS

101: access point
102, 103, 104, 105, 106: terminal station
107: access manager
108: authentication server group
201: antenna
202: RF unit
203: BB signal processing unit
204: MAC processing unit
205: main control unit
206: interface
207: user data memory
208: control data memory
209: external network connection terminal
301: antenna
302: RF unit
303: BB signal processing unit
304: MAC processing unit
305: main control unit
306: interface
307: user data memory
308: control data memory
309: external network connection terminal
310: group ID memory

What is claimed is:

1. A radio communication system in which a plurality of terminal stations is connected to a network via an access point, the radio communication system comprising:
   an access manager connected to the access point,
   wherein the access manager includes:
   a group manager configured to manage the terminal stations in groups; and
   a radio resource manager configured to determine if bandwidth limit is necessary based on communication status of each of the groups and transmit from the access point a control message that allows communication of a particular group among the groups and stops communication of other groups when it is determined that the bandwidth limit is necessary.

2. The radio communication system of claim 1, wherein the group manager notifies the terminal stations that are under the control of the access point of identification information of the groups to which the respective terminal stations belong,
the radio resource manager transmits the control message storing identification information of the particular group whose communication is allowed from the access point, and
each of the terminal stations stops communication when the identification information of the particular group stored in the control message is not matched with the identification information of the group to which the corresponding terminal station belongs.

3. The radio communication system of claim 2, wherein the identification information of the groups are values that are not overlapped with MAC addresses of the respective terminal stations,
the control message is an RTS message or a CTS message in which the identification information of the particular group whose communication is allowed is stored in a receiver address field, and
each of the terminal stations stops communication when the receiver address field of the RTS message or the CTS message is not matched with both of a MAC address of the corresponding terminal station and the identification information of the group to which the corresponding terminal station belongs.

4. An access control method in a radio communication system in which a plurality of terminal stations is connected to a network via an access point,
wherein the access point is connected to an access manager,
the access control method comprising:
causing the access manager to notify the terminal stations that are under the control of the access point of identification information of the groups to which the respective terminal stations belong;
causing the access manager to determine if bandwidth limit is necessary based on the communication status of each of the groups and transmit, when it is determined that the bandwidth limit is necessary, a control message storing identification information of a particular group whose communication is allowed from the access point to thereby allow communication of a particular group among the groups and stop communication of other groups; and
causing each of the terminal stations to stop communication when the identification information of the particular group stored in the control message is not matched with the identification information of the group to which the corresponding terminal stations belongs.

* * * * *